(12) United States Patent
Moore et al.

(10) Patent No.: US 7,252,468 B2
(45) Date of Patent: Aug. 7, 2007

(54) METHODS AND DEVICES FOR ADAPTING A CARGO CONTAINER TO DIRECTLY INTERFACE WITH AN AIRCRAFT CARGO BAY

(75) Inventors: Philip Moore, Sumter, SC (US); Anthony Hawes, Round O, SC (US)

(73) Assignee: Sea Containers America, Inc., New York, NY (US)

( * ) Notice: Subject to any disclaimer, the term of this patent is extended or adjusted under 35 U.S.C. 154(b) by 0 days.

(21) Appl. No.: 11/396,600

(22) Filed: Apr. 4, 2006

(65) Prior Publication Data

US 2006/0182509 A1 Aug. 17, 2006

Related U.S. Application Data

(62) Division of application No. 10/427,994, filed on May 2, 2003, now Pat. No. 7,125,212.

(60) Provisional application No. 60/376,825, filed on May 2, 2002.

(51) Int. Cl.
*B60P 7/06* (2006.01)
(52) U.S. Cl. ........................................ 410/46
(58) Field of Classification Search ................ 410/46, 410/52, 56, 71, 77, 82, 83, 90
See application file for complete search history.

(56) References Cited

U.S. PATENT DOCUMENTS

| | | | |
|---|---|---|---|
| 2,590,941 A | 4/1952 | Coit, Jr. | |
| 3,331,333 A | 7/1967 | Coulson | |
| 3,480,174 A | 11/1969 | Sherwood | |
| 3,643,603 A * | 2/1972 | King | 410/130 |
| 3,891,170 A | 6/1975 | Bricker et al. | |
| 3,924,871 A | 12/1975 | Mesenbring | |
| 4,079,907 A * | 3/1978 | Mykleby | 410/46 |
| 4,284,013 A * | 8/1981 | Davidson | 108/51.11 |
| 4,629,379 A | 12/1986 | Harris et al. | |
| 5,180,134 A | 1/1993 | Mallak | |
| 5,676,065 A | 10/1997 | Locker | |
| 5,706,738 A | 1/1998 | Rapeli | |
| 5,765,977 A | 6/1998 | Reynard | |
| 5,852,980 A | 12/1998 | Hance | |
| 5,865,579 A * | 2/1999 | Thomas | 410/92 |
| 6,044,773 A | 4/2000 | Bauer | |

(Continued)

*Primary Examiner*—H Gutman
(74) *Attorney, Agent, or Firm*—Wiley Rein LLP

(57) ABSTRACT

The present invention relates generally to a skid assembly for use with a cargo container. In one particular embodiment, the skid assembly comprises an elongate member having an upper surface, a lower surface, and a side surface; a plurality of side extensions spaced at predetermined intervals along the side surface; and at least two locking fittings, attached to the upper surface, for removably attaching the skid assembly to at least two corresponding castings located on the lower surface of a cargo container. Alternately, the skid assembly may comprise: an elongate member having an upper surface, a lower surface, two end surfaces, and an end extension extending from each of the two end surfaces for slideably engaging at least two elongate tracks of a cargo locking system. The present invention also relates to methods for adapting a cargo container to directly interface with an aircraft cargo bay floor having a cargo conveyor system to permit cargo to slide along the aircraft cargo bay floor and a cargo locking system to lock the cargo in place.

11 Claims, 13 Drawing Sheets

U.S. PATENT DOCUMENTS

| | | |
|---|---|---|
| 6,123,208 A | 9/2000 | Hasenszel |
| 6,349,656 B1 * | 2/2002 | Mitchell .................. 108/57.13 |
| 6,427,947 B1 * | 8/2002 | Rohrlick et al. ......... 244/137.1 |
| 6,814,529 B2 * | 11/2004 | Junge .......................... 410/46 |
| 6,817,578 B1 * | 11/2004 | Garcia et al. ............ 244/137.1 |
| 2002/0005150 A1 | 1/2002 | Taylor |
| 2003/0190207 A1 * | 10/2003 | Junge ............................ 410/3 |
| 2003/0206781 A1 | 11/2003 | Moore et al. |
| 2004/0018067 A1 | 1/2004 | Taylor et al. |
| 2006/0039771 A1 * | 2/2006 | Zhou ........................... 410/84 |

* cited by examiner

METHODS AND DEVICES FOR ADAPTING A CARGO CONTAINER TO DIRECTLY INTERFACE WITH AN AIRCRAFT CARGO BAY

RELATED APPLICATIONS

This application is a divisional of U.S. patent application 10/427,994, which was filed May 2, 2003, now U.S. Pat. No. 7,125,212, issued Oct. 24, 2006, and which claimed priority to U.S. Provisional Application No. 60/376,825, filed May 2, 2002. Both the non-provisional and the provisional applications are incorporated by reference herein in their entireties.

FIELD OF THE INVENTION

The present invention pertains generally to cargo container systems and, more particularly to cargo container systems for cargo aircraft.

BACKGROUND OF THE INVENTION

Adapting standard cargo containers for air transport is a vital requirement of military and commercial air cargo communities. Lessons learned from the U.S. Armed Forces' recent deployments and engagements have proved the utility of quadcon and tricon containers and highlighted a need for improved air transportability of these products. Quadcon containers are designed so that when four quadcon units are secured together, the combined package has the same footprint as an ISO standard 20-foot intermodal container. Similarly, tricon containers are designed so that when three tricon units are secured together, the combined package has the same footprint as an ISO standard 20-foot intermodal container. An advantage of quadcon and tricon containers is that they can be are separated into individual units, thereby permitting each quadcon or tricon unit to be handled by standard material handling equipment. This greatly simplifies ground transport handling and speeds the process of airfield clearance. Currently in order to move quadcon or tricon units by air, each container must be disconnected from its 3 or 4 container train, placed on a standard 463 L pallet, with appropriate dunnage, and chained to the pallet. This process increases deployment times at the mode transition points (e.g., from ground to air transport and from air to ground transport) and places a demand for large quantities of pallets, dunnage, and chains at the aerial port of embarkation. The present invention markedly improves the capability to rapidly adapt standard cargo containers to directly interface with cargo loading systems of cargo aircraft by eliminating the need to palletize the containers using pallet systems, dunnage, and chains, thus eliminating a logistics nightmare and bottleneck for transportation mode change points.

SUMMARY OF THE INVENTION

Disclosed herein is a skid assembly for adapting a cargo container to directly interface with an aircraft cargo bay floor having a cargo conveyor system and a cargo locking system to lock the cargo in place. The cargo locking system comprising a plurality of elongate tracks attached to a top surface of the aircraft cargo bay floor, and a retractable locking device which is movable between two positions, 1) a retracted position wherein the retractable locking device is substantially retracted so as to permit the skid assembly to move along at least one of the plurality of elongate tracks, and 2) an engaged position wherein at least one locking pin of the retractable locking device is extended above the top surface of the aircraft cargo bay floor to prevent the skid assembly from moving along at least one of the plurality of elongate tracks. The skid assembly has: an elongate member having an upper surface, a lower surface, and a side surface that extends between said upper surface and said lower surface and a plurality of side extensions for slideably engaging at least one of the plurality of elongate tracks, a plurality of side extensions being spaced at predetermined intervals along the side surface such that the skid assembly can freely move along at least one of the plurality of elongate tracks when the retractable locking device is in the retracted position, and such that the skid assembly is restrained from moving along at least one of the plurality of elongate tracks when the retractable locking device is in the engaged position. The skid assembly also has: a first locking fitting, attached to the upper surface, for removably attaching the skid assembly to a first casting located on the lower surface of a cargo container; and a second locking fitting, attached to the upper surface, for removably attaching the skid assembly to a second casting located on the lower surface of a cargo container, and positioned relative to the first locking fitting to permit the first and second locking fittings to be simultaneously removably attached to the first and second castings, respectively. The assembly may further comprise at least one extendable portion for varying the spacing between the first locking fitting and the second locking fitting to enable the assembly to be adapted to attach to cargo containers of a plurality of sizes. The extendable portion may be retractable to reduce the overall dimensions of the assembly for storage. Preferably, at least one of the first and second locking fittings comprises a twist-lock clamping device. At least one of the first and second castings preferably comprises an ISO corner casting. The first and second locking fittings may be fixedly attached to the upper surface of the elongate member, but spaced at a predetermined distance to permit engagement with the cargo container. The cargo locking system and the cargo conveyor system preferably are part of a 463 L cargo system.

Also disclosed herein is a skid assembly for use with a cargo container, the skid assembly comprising: an elongate member having an upper surface, a lower surface, and a side surface that extends between said upper surface and said lower surface; a plurality of side extensions spaced at predetermined intervals along the side surface; a first locking fitting, attached to the upper surface, for removably attaching the skid assembly to a first casting located on the lower surface of a cargo container; and a second locking fitting, attached to the upper surface, for removably attaching the skid assembly to a second casting located on the lower surface of a cargo container. The second locking fitting is positioned relative to the first locking fitting to permit the first and second locking fitting to be simultaneously removably attached to the first and second castings, respectively. The assembly may further comprise at least one extendable portion for varying the spacing between the first locking fitting and the second locking fitting to enable the assembly to be adapted to attach to cargo containers of a plurality of sizes. The extendable portion may be retractable to reduce the overall dimensions of the assembly for storage. At least one of the first and second castings may comprise an ISO corner casting.

Also disclosed herein is a skid assembly for use with a cargo container, the skid assembly comprising: an elongate member having an upper surface, a lower surface, a first end surface that extends between an end of said upper surface and a proximate end of said lower surface and a second end surface opposite said first end surface that extends between said upper surface and said lower surface. The skid assembly has at least one end extension extending from the first end surface for slideably engaging a first elongate track of a cargo locking system, and at least one end extension extending from the second end surface for slideably engaging a second elongate track of a cargo locking system. The skid assembly also has a first locking fitting, attached to the upper surface, for removably attaching the skid assembly to a first casting located on the lower surface of a cargo container, and a second locking fitting, attached to the upper surface, for removably attaching the skid assembly to a second casting located on the lower surface of a cargo container, and positioned relative to the first locking fitting to permit the first and second locking fitting to be simultaneously removably attached to the first and second castings, respectively, of the cargo container. The assembly further may comprise at least one movable portion for varying the spacing between the first locking fitting and the second locking fitting to enable the assembly to be adapted to attach to cargo containers of a plurality of sizes. The assembly also further may comprise at least one extendable portion for varying the spacing between at least one end extension extending from the first end and at least one end extension extending from the second end to slideably engage cargo locking systems of a plurality of sizes.

Also disclosed herein is a skid assembly for use with a cargo container, the skid assembly having an elongate member having an upper surface, a lower surface, and a side surface that extends between said upper surface and said lower surface. The skid assembly also has at least one side extension extending from the side surface; a first locking fitting, attached to the upper surface, for removably attaching the skid assembly to a first casting located on the lower surface of a cargo container; and a second locking fitting, attached to the upper surface, for removably attaching the skid assembly to a second casting located on the lower surface of a cargo container. The second locking fitting is positioned relative to the first locking fitting to permit the first and second locking fitting to be simultaneously removably attached to the first and second castings, respectively. At least one side extension further may comprise at least one opening for receiving a locking pin.

Also disclosed herein is a skid assembly for use with a cargo container, which skid assembly has an elongate member having an upper surface, a lower surface, and a side surface that extends between said upper surface and said lower surface. The skid assembly also has at least one side extension extending from the side surface having at least one opening for receiving a locking pin; a first locking fitting, attached to the upper surface, for removably attaching the skid assembly to a first casting located on the lower surface of a cargo container; and a second locking fitting, attached to the upper surface, for removably attaching the skid assembly to a second casting located on the lower surface of a cargo container. The second locking fitting is positioned relative to the first locking fitting to permit the first and second locking fitting to be simultaneously removably attached to the first and second castings, respectively. The second locking fitting may be positionable relative to the first locking fitting by at least one extendable portion of the elongate member, to permit the first and second locking fittings to be simultaneously removably attached to corresponding first and second castings, respectively, of cargo containers of a plurality of sizes.

Also disclosed herein is a method for adapting a cargo container having a bottom surface with at least four castings to directly interface with an aircraft cargo bay floor having a cargo conveyor system to permit cargo to slide along the aircraft cargo bay floor and a cargo locking system to lock the cargo in place. The cargo locking system comprises a plurality of elongate tracks attached to a floor surface of an aircraft, and a retractable locking device which is movable between two positions, 1) a retracted position wherein the retractable locking device is substantially retracted so as to permit the container adapting device to move along at least one of the plurality of elongate tracks, and 2) an engaged position wherein at least one locking pin of the retractable locking device is extended above the top surface of the aircraft cargo bay floor to prevent the container adapting device from moving along at least one of the plurality of elongate tracks. The referenced method includes the steps of: providing a first container adapting device and a second container adapting device, each comprising an upper surface, a lower surface, a side surface that extends between said upper surface and said lower surface, at least two locking fittings attached to the upper surface and spaced a predetermined distance apart to simultaneously engage a corresponding at least two castings of the cargo container, and a plurality of side extensions extending at predetermined intervals from the side surface of the container adapting device; attaching the first container adapting device to at least two of the castings located in proximity to a first edge of the bottom surface of the container such that a plurality of side extensions of the first container adapting device extend outward past the first edge of the bottom surface of the cargo container; and attaching the second container adapting device to at least two of the castings located in proximity to a second edge of the bottom surface of the cargo container such that a plurality of side extensions of the second container adapting device extend outward past the second edge of the bottom surface of the cargo container. The second edge is located opposite the first edge such that when the first and second container adapting devices are attached to the cargo container to form an adapted cargo container, a plurality of side extensions of the first container adapting device are spaced a distance from a plurality of side extensions of the second container adapting device to slideably engage at least two of the plurality of elongate tracks, thereby adapting the cargo container to directly interface with an aircraft cargo bay floor. At least one of the two container adapting devices further may comprise at least one extendable portion of the elongate member for varying the spacing between a first locking fitting and a second locking fitting to enable the container adapting device to be extended or retracted, as necessary, to attach to cargo containers of a plurality of sizes. The cargo container may be a selected one of a 20-foot container, a 10-foot container, a 14 foot shelter, a quadcon container, and a tricon container.

Also disclosed herein is an adapted storage container assembly having: a cargo container having a bottom surface, the bottom surface having a first edge and a second edge opposite the first edge; a first container adapting device having an upper surface, a lower surface, a side surface that extends between said upper surface and said lower surface, and a plurality of side extensions extending at predetermined intervals from the side surface of the container adapting device. The upper surface of the first container adapting device is secured to the bottom surface of the cargo container such that a plurality of side extensions of the first container adapting device extend outward past the first edge of the bottom surface of the cargo container. The adapted storage container also has a second container adapting device having an upper surface, a lower surface, a side surface that extends between said upper surface and said lower surface, and a plurality of side extensions extending at predetermined intervals from the side surface of the container adapting device. The upper surface of the second container adapting device is secured to the bottom surface of the cargo container such that a plurality of side extensions of the second container adapting device extend outward past the second edge of the bottom surface of the cargo container. The bottom surface of the cargo container may further comprise at least four castings. Each of the first and second container adapting devices may have at least two locking fittings attached to its respective upper surface and spaced a distance apart to simultaneously engage a corresponding at least two castings of the cargo container. The upper surface of the first container adapting device may be secured to the bottom surface of the cargo container by removably attaching at least two locking fittings to a corresponding at least two castings of the bottom surface of the cargo container. The upper surface of the second container adapting device may be secured to the bottom surface of the cargo container by removably attaching at least two locking fittings to a corresponding at least two castings of the bottom surface of the cargo container.

Further disclosed herein is a method for loading a cargo container within the cargo bay of a cargo aircraft with the use of a new and improved skid assembly. The cargo container has a bottom surface with a plurality of castings. The cargo bay may have a cargo locking system and a cargo conveyor system. The cargo locking system may have a plurality of elongate tracks attached to a floor surface of the cargo bay, and a retractable locking device which is movable between two positions, 1) a retracted position wherein the retractable locking device is substantially retracted so as to permit the container adapting system to move along at least one of the plurality of elongate tracks, and 2) an engaged position wherein at least one locking pin of the retractable locking device is extended above the top surface of the aircraft cargo bay floor to prevent the container adapting system from moving along at least one of the plurality of elongate tracks. The method includes the steps of: providing a first container adapting system and a second container adapting system (each comprising: an upper surface; a lower surface; a side surface that extends between said upper surface and said lower surface; at least two locking fittings attached to the upper surface and spaced a predetermined distance apart to simultaneously engage a corresponding at least two castings of the cargo container; and a plurality of side extensions extending at predetermined intervals from the side surface of the container adapting system); attaching the first container adapting system to at least two of the plurality of castings located in proximity to a first edge of the bottom surface of the cargo container such that a plurality of side extensions of the first container adapting system extend outward past the first edge of the bottom surface of the cargo container; attaching the second container adapting system to at least two of the plurality of castings located in proximity to a second edge of the bottom surface of the cargo container such that a plurality of side extensions of the second container adapting system extend outward past the second edge of the bottom surface of the cargo container, the second edge located opposite the first edge such that when the first and second container adapting systems are attached to the cargo container to form an adapted cargo container, a plurality of side extensions of the first container adapting system are spaced a distance from a plurality of side extensions of the second container adapting system to slideably engage at least two of the plurality of elongate tracks; sliding the adapted cargo container along the cargo conveyor system to a locking position such that a plurality of side extensions of the adapted cargo container do not block the movement of the retractable locking device from the stowed position to the engaged position; and locking the adapted cargo container in the locking position by moving the retractable locking device from the retracted position to the engaged position, thereby preventing the movement of the adapted cargo container, including while the cargo aircraft is in motion. At least one of the two container adapting systems further may comprise at least one extendable portion for varying the spacing between a first locking fitting and a second locking fitting to enable the container adapting system to be adapted to attach to cargo containers of a plurality of sizes. The cargo locking system and the cargo conveyor system are part of a 463 L cargo system. The cargo container is a selected one of a 20-foot container, a 10-foot container, a 14 foot shelter, a quadcon container, and a tricon container.

DETAILED DESCRIPTION OF THE INVENTION

Figure 1:
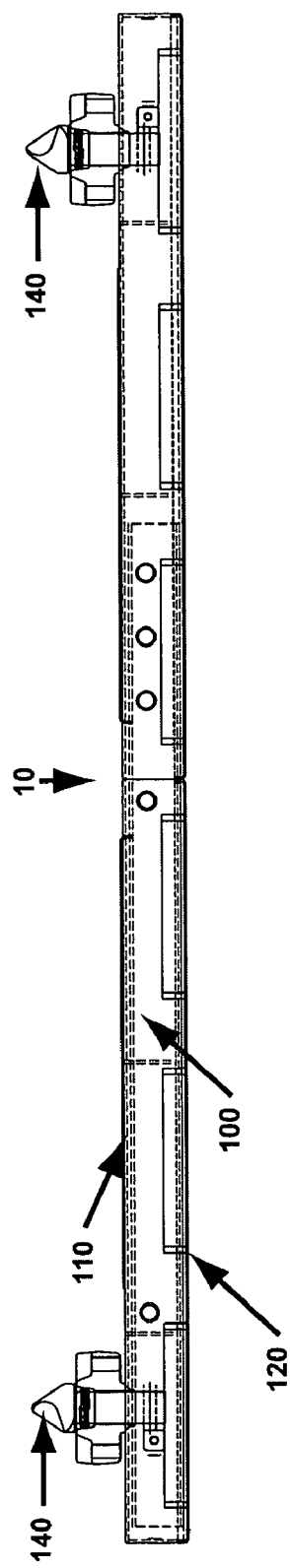
FIG. 1 represents a side view of a preferred embodiment of the present invention in a retracted position.

Transporting heavy loads as cargo on aircraft presents greater challenges than transporting the same loads using land and/or water vessels. Aircraft cargo systems must be able to restrain cargo from unwanted movement in any direction even when the cargo aircraft is subjected to substantial "G" forces. The high acceleration and deceleration rates, combined with the sudden drops and rises encountered in flight, require that cargo be sufficiently secured in the aircraft's cargo bay to survive the constantly changing forces to which the aircraft is subjected. Aircraft cargo restraint systems are known in the art.

Many cargo aircraft, including military cargo aircraft, have standardized cargo restraint systems. Due to the nature of the military airlift mission, military cargo aircraft are often required to complete multiple resupply missions with short turnaround times. They also are required to withstand greater "G" forces than comparable commercial cargo aircraft due to their combat mission. Because the same cargo container may be transported on a C-17 on one mission and a C-130 on the next, standardized cargo restraint systems have been developed to allow the same pallets to be used on a variety of military cargo aircraft. Additionally, during times with heightened cargo volume requirements, such as wartime, cargo aircraft of the Civil Reserve Air Force (CRAF), such as the CRAF B747 will be called into service to augment the standing military air cargo capacity. Moreover, aircraft such as the Airbus A400M may serve dual roles as commercial cargo transports and military cargo transports. It is beneficial for such dual role cargo transports also to employ standardized cargo restraint systems to be interoperable with their military counterparts.

Aircraft cargo restraint systems are known in the art. One widely used system is the 463 L Air Cargo System, which utilizes a cargo restraint system installed in the aircraft cargo bay floor, including a cargo conveyor system to permit cargo to slide along the aircraft cargo bay floor and a cargo locking system to lock the cargo in place. Generally, the cargo conveyor system includes a plurality of elongate tracks attached to a top surface of the aircraft cargo bay floor, which tracks will accommodate a plurality of palates upon which cargo is secured (typically by chains). A cargo locking system is also used to secure the pallets in place in the elongate tracks. The cargo locking system utilizes a locking device (e.g., a plurality of locking pins) which is movable between two positions, 1) a retracted position wherein the retractable locking device is sufficiently retracted so as to permit a pallet to move along the elongate tracks, and 2) an engaged position wherein the retractable locking device is sufficiently extended above the top surface of the aircraft cargo bay floor to prevent a pallet from moving along the elongate tracks. The locking device may operate using a plurality of locking pins which can be raised and fit between a plurality of spaced side extensions on the pallet to restrict movement. The elongate tracks also serve as part of the cargo locking system by restraining palletted containers from moving laterally (along the cargo bay floor perpendicular to the tracks) or vertically (perpendicular to the cargo bay floor). The combination of the elongate tracks and the locking device restrain palletted containers from unwanted movement in any direction.

A variety of standard container sizes have been developed and specified for use with standardized cargo restraint system. One such container is an ISO standard 20-foot intermodal container. As discussed above, quadcon and tricon containers have been developed to accommodate the need for smaller containers on the ground while permitting four quadcon or three tricon containers to be combined to form a single container with the footprint of an ISO standard 20-foot intermodal container for interoperability with standardized aircraft cargo restraint systems such as the 463 L cargo restraint system. Using a standard-sized container permits the use of a standard-sized pallet.

The present invention permits standard containers more easily, more quickly, and less expensively to be adapted to directly interface an aircraft cargo restraint system. It also removes the limitation of only being able to use standard-sized containers or of only being able to use a particular container with a particular standardized aircraft cargo restraint system. The present invention attaches an adapter rail to the bottom of an ANSI/ISO standard or specialty size container. The adapter rail may be secured to the bottom of the container using any number of means, and preferably using ISO corner castings. Of course, any suitable locking fitting receptacle, which will be referred to generically as "casting," may be used. The adapter rail of the present invention has a side surface with a plurality of side extensions extending laterally therefrom, which side extensions are sized and spaced to engage the aircraft's cargo locking system. While a plurality of side extensions is preferred, the present invention may also utilize one or more side extensions having one or more integral openings positioned so as to receive the locking device that is typically extended upward from the floor of the aircraft cargo bay by the cargo locking system.

Once joined together, the adapter and container can be restrained in the cargo locking system without the need for any additional chains. The combined adapter and container are constrained from movement in the fore-aft direction (that is, in a direction parallel to the elongate tracks) by the aircraft locking system, which extends a locking device upward from the floor of the aircraft to fit between the plurality of side extensions, thereby blocking movement along the elongate tracks. The adapter and container are prevented from movement in the up-down direction (that is, in a direction perpendicular to the elongate tracks) by virtue of the fact that the adapter is slideably engaged in the elongate tracks, which tracks are shaped to prevent vertical disengagement. The adapter and the cargo locking system also restrain the container from moving in the lateral direction. Preferably, the cargo locking system comprises a plurality of elongated tracks, each of which includes a channel for receiving a plurality of side extensions and restricting lateral and vertical motion of the plurality of side extensions. In a preferred embodiment, the adapter includes one or more extension elements which permit a single adapter to be used for different sized containers.

The present invention alleviates the need to palletize the container using pallet systems, dunnage (i.e., packing materials), and chains, thus eliminating a logistics tail and bottleneck for the transportation mode change points. When the traditional pallet system is used, there is a tremendous overhead of pallets and accompanying materials required. For example, you have to have a multiplicity of each sized pallet to accommodate the multiplicity of different sized containers, and you need dunnage and chains to secure each container being secured to each pallet. Pallets, dunnage and chains have to be moved to wherever the containers are being processed and loaded. Pallets are expensive items, and so the costs escalate when multiple sized pallets have to be kept in inventory to accommodate multiple sized containers.

In contrast, the present invention provides a simple-to-use and significantly less expensive adapter to permit tricon and quadcon units to be loaded directly onto a 463 L military cargo system, without any pallets, dunnage, or chains. As will be clear to one of ordinary skill in the art, the principals of the present invention can be used to adapt ANSI/ISO standard or specialty-sized containers of various sizes to directly interface with existing and future cargo loading systems on aircraft as well as other transport means such as cargo ships, trains, and trucks. In a preferred embodiment, a single adapter can be extended or retracted, preferably using an extendable portion of the adapter, as necessary to align with the ISO corner castings on a plurality of ANSI/ISO standard or specialty-sized containers. For example, the present invention can be used to adapt a tricon unit to directly interface with the 88-inch spacing of the C17 Logistics Cargo System or to adapt a tricon or quadcon unit to directly interface with the 108-inch spacing of the C5, C141, C130, CRAF B747, and the C17 Airdrop system. Hence, a single adapter can be used for different sized containers, thereby eliminating the need to maintain multiple sized pallets. This alone will result in significant cost savings associated with the high quantities of pallets that are traditionally maintained in an air transport facility. In addition to the reduction in numbers, additional savings can be realized because the costs of the present invention is significantly less than the cost of a traditional pallet, resulting in additional cost savings. There is also a considerable savings realized because the significant reduction in weight of the packed cargo. A traditional pallet size exceeds overall dimensions of 20 feet by 6 feet. With the present invention, the system that employs the skid assembly would involve two elongate members that occupies a small fraction of the 20'×6' dimension. Accordingly, a pair of skid assemblies is used in lieu of a large pallet, thereby realizing a reduction in weight as much as 50% to 60% (i.e., the skid assemblies could weigh as little as 40% to 50% of the weight associated with a traditional pallet). The actual weight reductions will depend on the manufacturing materials and techniques used. The materials used for the skid assemblies may include steel, aluminum, composites and any other suitable material capable of withstanding the loads required for use in aircraft cargo applications. Various manufacturing techniques may be employed to reduce the structural weight of the skid assemblies while still meeting the load-bearing specifications for cargo aircraft applications, including those conventionally applied to aircraft structures and those used for conventional cargo pallets, for example, honeycomb, monocoque, or semi-monocoque structures.

A preferred embodiment of the present invention is a simple-to-use adapting device, possessing 1) a plurality of side extensions extending from a side surface to engage the aircraft's cargo locking system, 2) at least two locking fittings to lock the container to the adapter, preferably using the ISO corner castings of the container, and 3) an extended lower surface that presents a substantially flat surface to the aircraft cargo conveyor system. The locking fittings are preferably twist-lock clamping devices of the type described in U.S. Pat. No. 5,765,977 to Reynard, which patent is hereby incorporated by reference in its entirety. The locking fittings also are preferably fixedly attached to the opposite ends of the upper surface of the elongate member such that they are vertically oriented when the elongate member is resting on the lower surface. The term "fixedly attached" is used to describe an attachment that is effectively rigid, which may be accomplished using technology known in the art, including without limitation, for example, by welding or bolting the locking fittings to the opposite ends of the upper surface. This permits the cargo container to be lowered, by forklift or other suitable means, onto the adapter such that the locking fittings engage corresponding corner castings of the cargo container to removably attach the cargo container to the adapter. For the purposes of this invention, the term "end of the upper surface" when used in conjunction with the locking fittings, refers generally to a location proximate the lengthwise extremes of the elongate member but may be inset from those lengthwise extremes to allow sufficient room for the locking fittings to be mounted to the upper surface of the elongate member. Preferably, the adapter includes an extendable portion that permits the distance between the locking fittings to be adjusted to accommodate a variety of spacings of corner castings on containers of various sizes and additionally can be retracted to permit the adapter to be stored inside the container when not in use. The lower surfaces of the adapters are preferably substantially smooth, which, for the purposes of the present invention, means sufficiently flat to permit the adapted container to slide over the cargo conveyor system of a cargo aircraft. Preferably, two adapters are attached to the bottom of a container on opposing sides to form an adapted container to directly interface with the cargo locking system of a cargo aircraft. Preferably, the adapters, when installed add a minimal amount of height to the container and allow the container with adapters installed to meet cargo aircraft height restrictions.

The use of the locking fittings to secure the adapting device to the cargo container eliminates the need for chains and substantially reduces or eliminates the need for dunnage. This alone significantly reduces the logistics tail that typically follows a transportation effort. Moreover, because locking fittings can be used to quickly secure a container to the adapter device, a substantial time savings will be realized over the traditional methods of carefully wrapping each container and/or then securing the container with chains.

Figure 2:
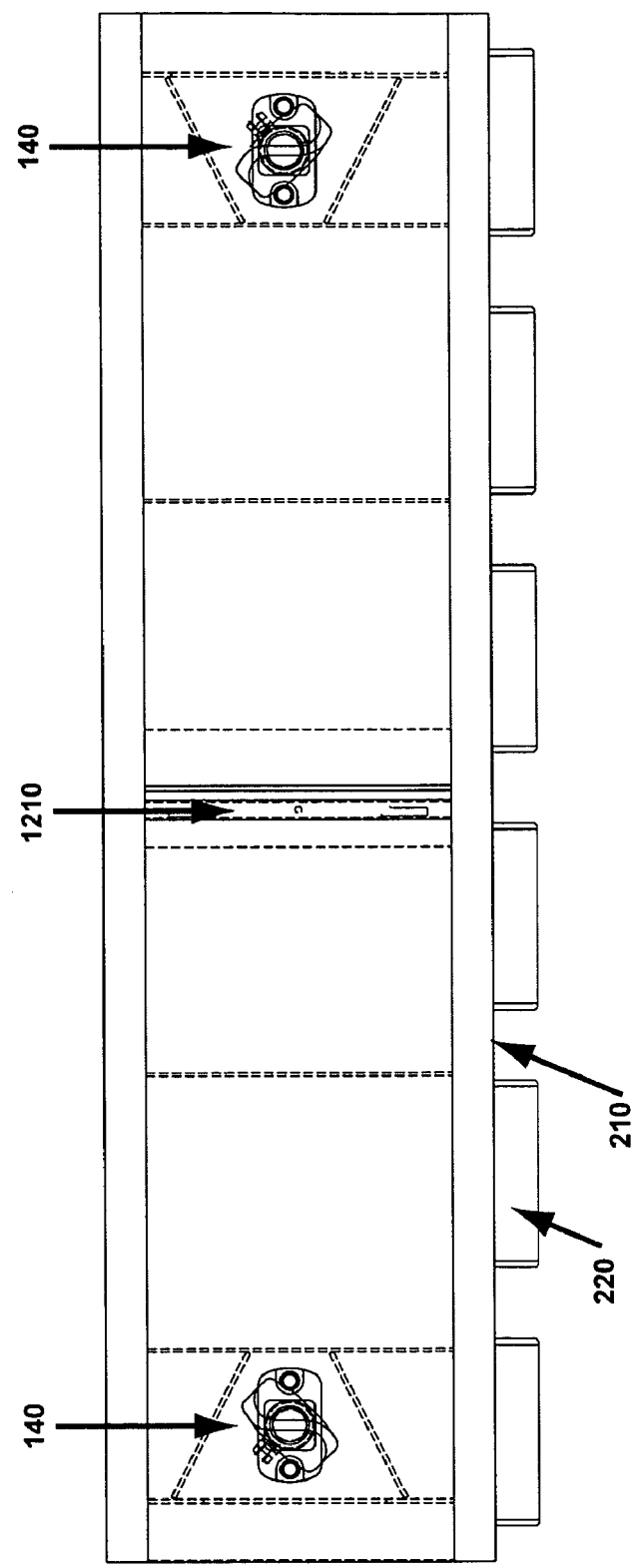
FIG. 2 represents a top view of the preferred embodiment of FIG. 1 in a retracted position.
Figure 3:
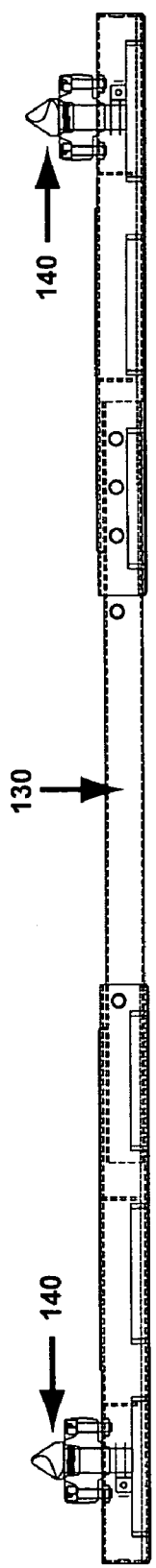
FIG. 3 represents a side view of the preferred embodiment of FIG. 1 in an extended position.

Referring now to the drawings, a preferred embodiment of an improved skid assembly is shown in FIGS. 1-6. More particularly, improved skid assembly 10 can adapt a cargo container to directly interface with an aircraft cargo bay floor, preferably having a cargo conveyor system to permit cargo containers to slide along the aircraft cargo bay floor and a cargo locking system to lock the cargo in place. As illustrated in FIG. 1, skid assembly 10 comprises elongate member 100 having upper surface 110, lower surface 120, extendable portions 130, and locking fittings 140. FIG. 1 depicts a side view of the skid assembly in a retracted position and FIG. 3 depicts a side view of the skid assembly in an extended position. While improved skid assembly 10 is illustrated as having two extendable portions 130 that permit adjustment in overall length and simultaneously relative positioning between locking fittings 140, it is contemplated that the present invention can be used without any extendable portions, as well as with one or more extendable portions. For example, a single extendable portion (not shown) could be positioned at or near the center of the elongate member, permitting a single adjustment to vary the spacing between the locking fittings and simultaneously the overall length of the elongate member.

FIG. 2 provides a top view of skid assembly 10 in a retracted position, which further comprises side surface 210 with at least one side extension 220 extending there from.

Figure 4:
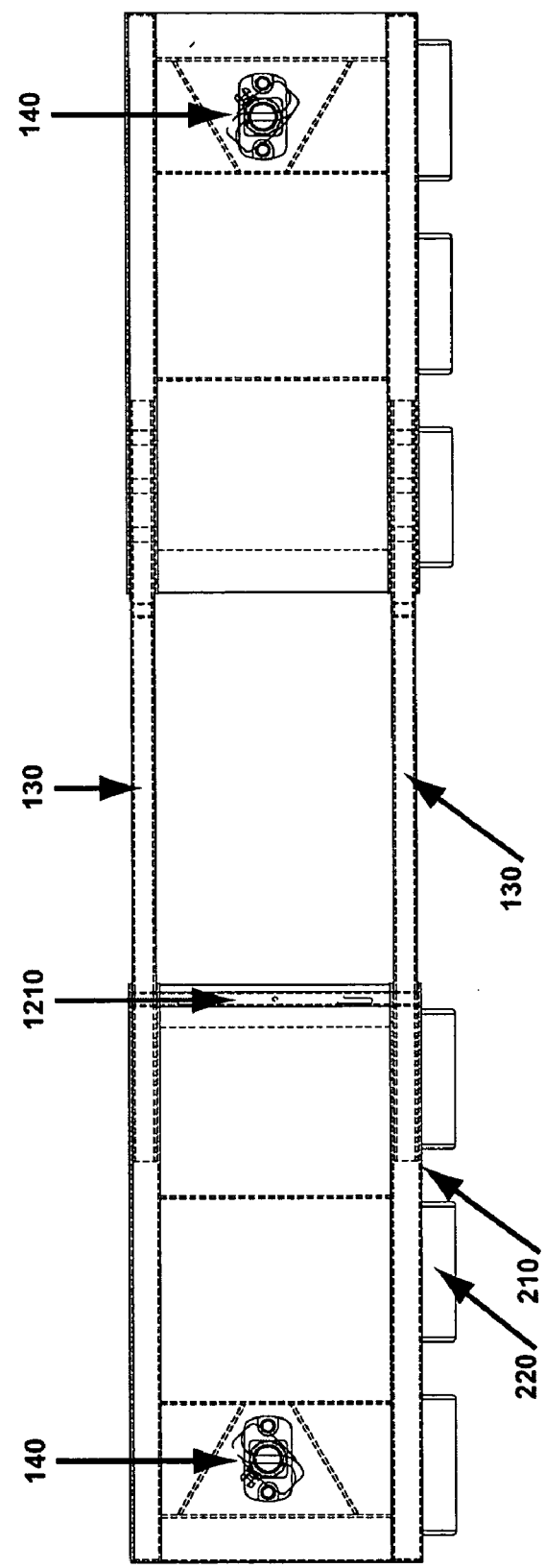
FIG. 4 represents a top view of the preferred embodiment of FIG. 1 in an extended position.

Preferably, side extensions extend from a single side surface of the elongate member. As discussed above, in a preferred embodiment, one or both extendable portions 130 may be extended or retracted, as necessary to adjust the distance between locking fittings 140 to mate up with corresponding castings 1310 on a cargo container. FIG. 4 depicts the improved skid assembly in an extended position.

Figure 5:
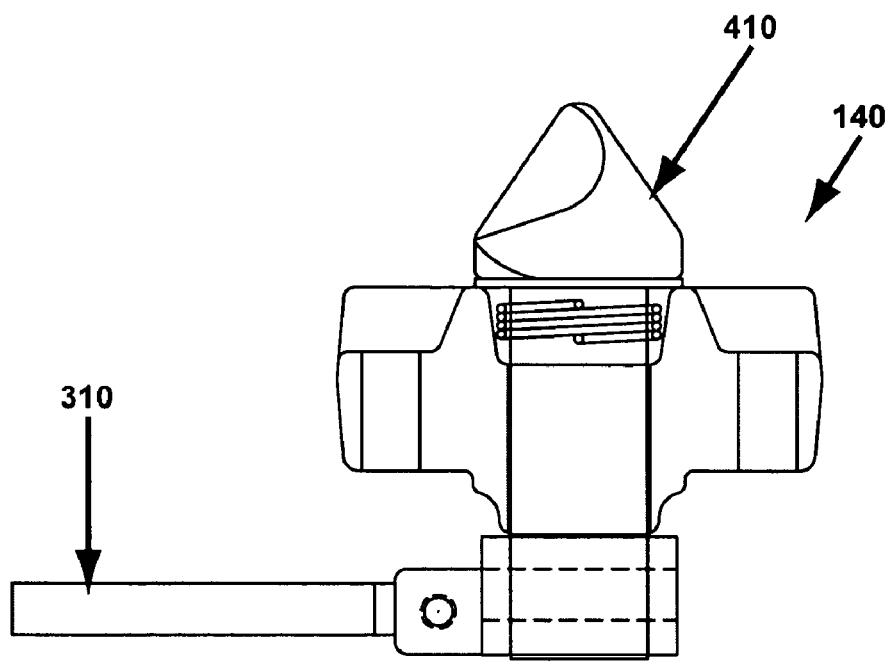
FIG. 5 represents an expanded side view of a preferred locking fitting for use with the preferred embodiment of the FIG. 1.
Figure 6:
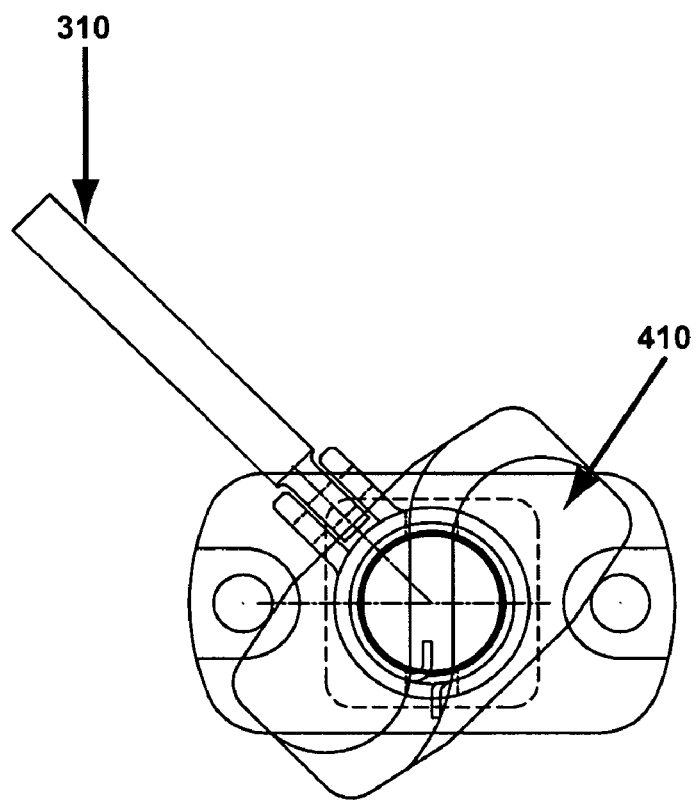
FIG. 6 represents an end view of the locking fitting of FIG. 5.

As shown in FIGS. 5 and 6, the locking fittings are preferably twist-lock clamping devices such as those described in U.S. Pat. No. 5,765,977 to Reynard, which patent is hereby incorporated by reference in its entirety. Locking fitting 140 includes rotatable clamping head 410 and release lever 310. Clamping head 410 is biased in a locked position and is shaped such that during loading and clamping of a container, clamping head 410 will rotate to a clamping position that will allow the clamping head to enter casting 1310 of container 1320. Once the clamping head enters an internal recess of corner casting 1310, a biasing mechanism will force the clamping head into the locked position, thereby removably attaching skid assembly 10 to container 1320.

Figure 7:
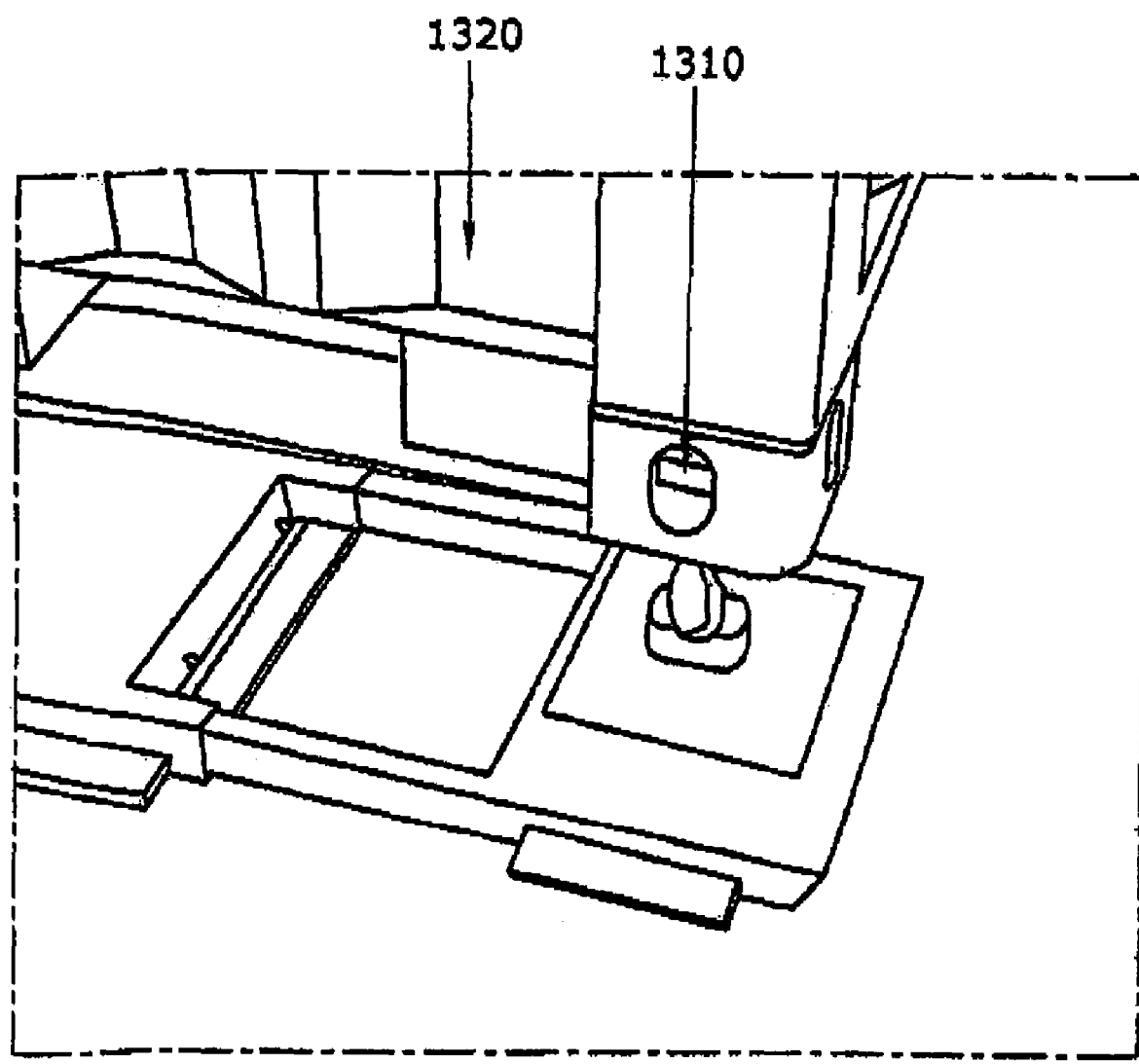
FIGS. 7-14 are photographs of preferred embodiments of the present invention showing the functionality of the features discussed below.
Figure 8:
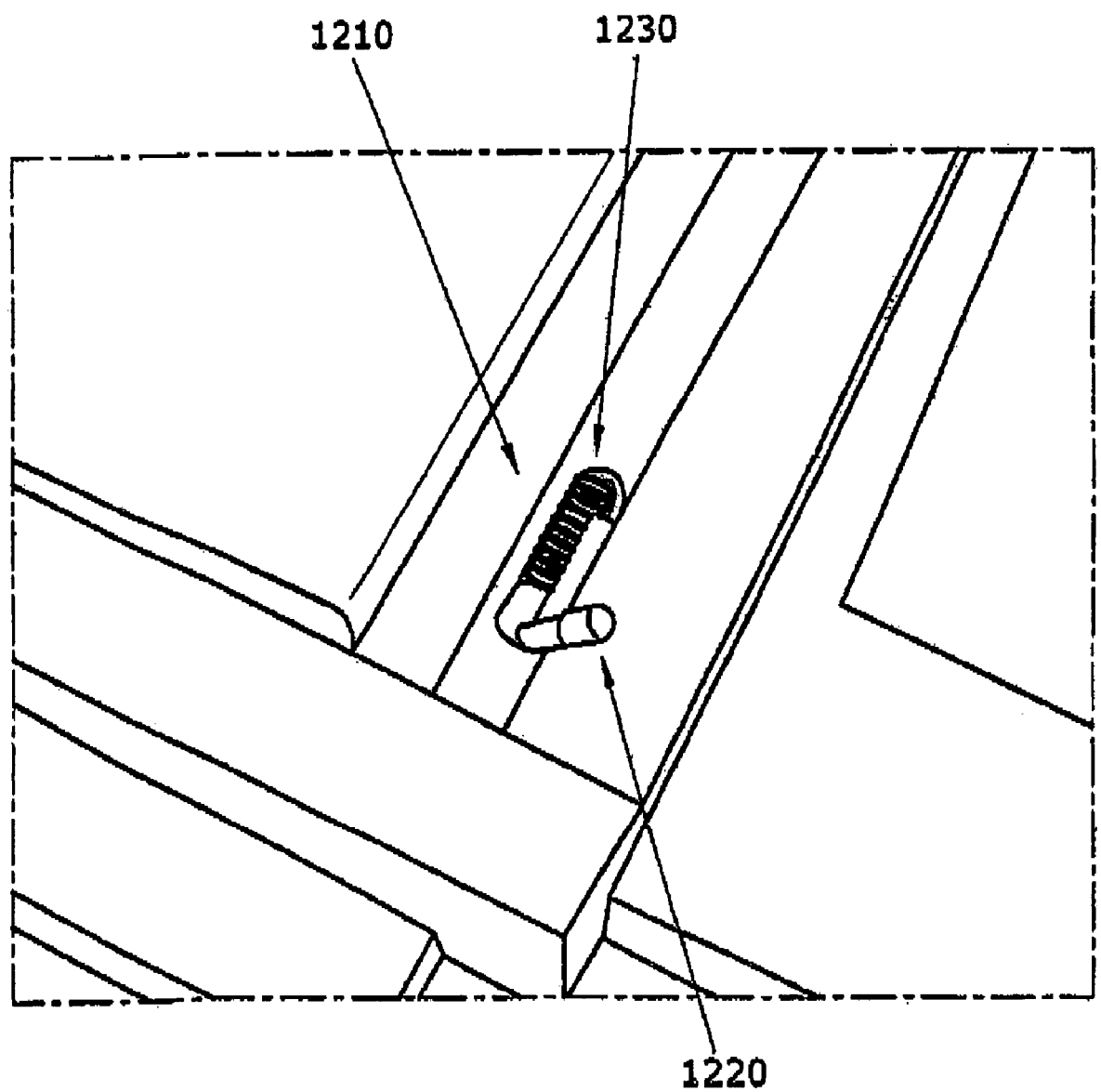
Figure 9:
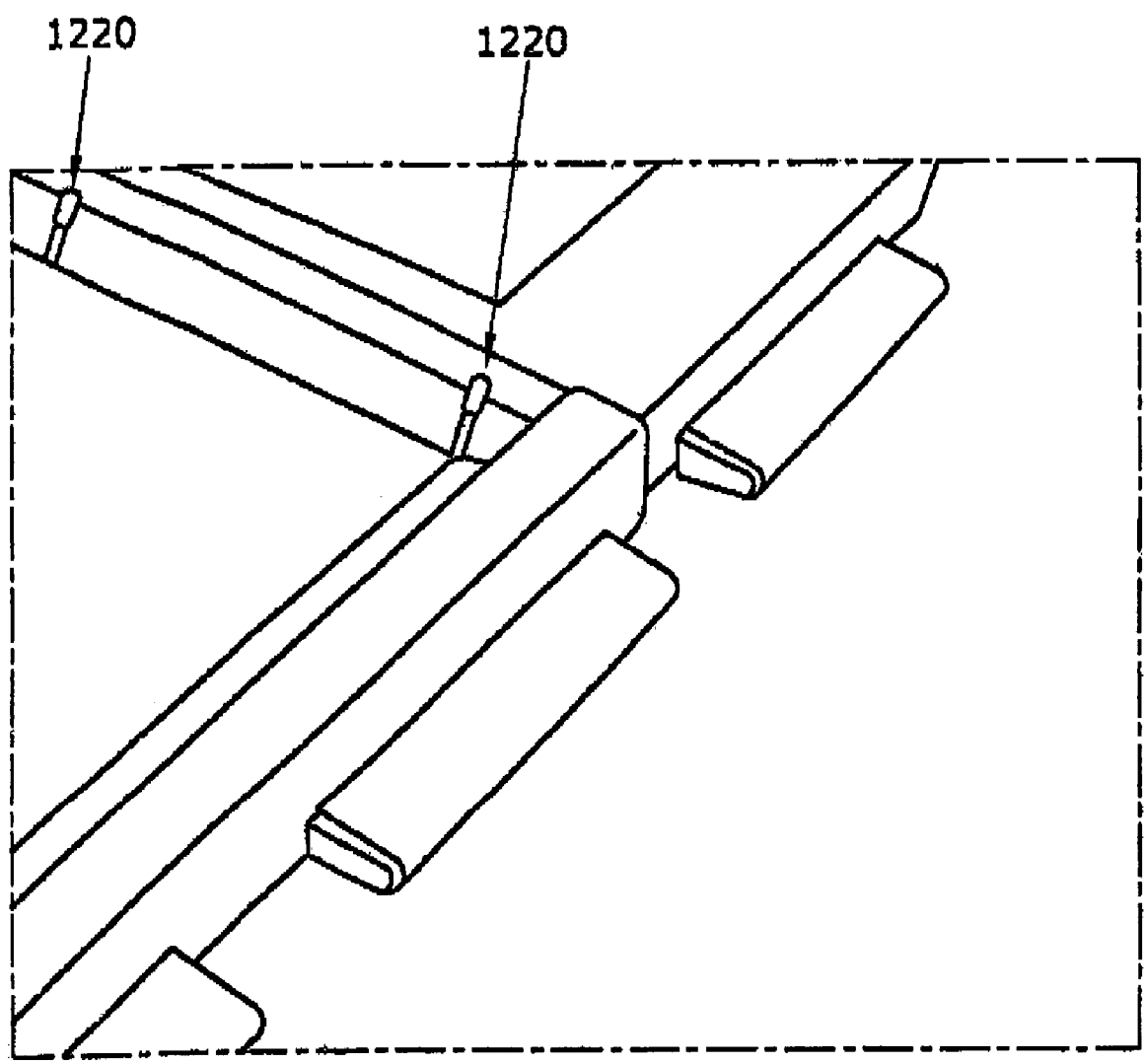
Figure 10:
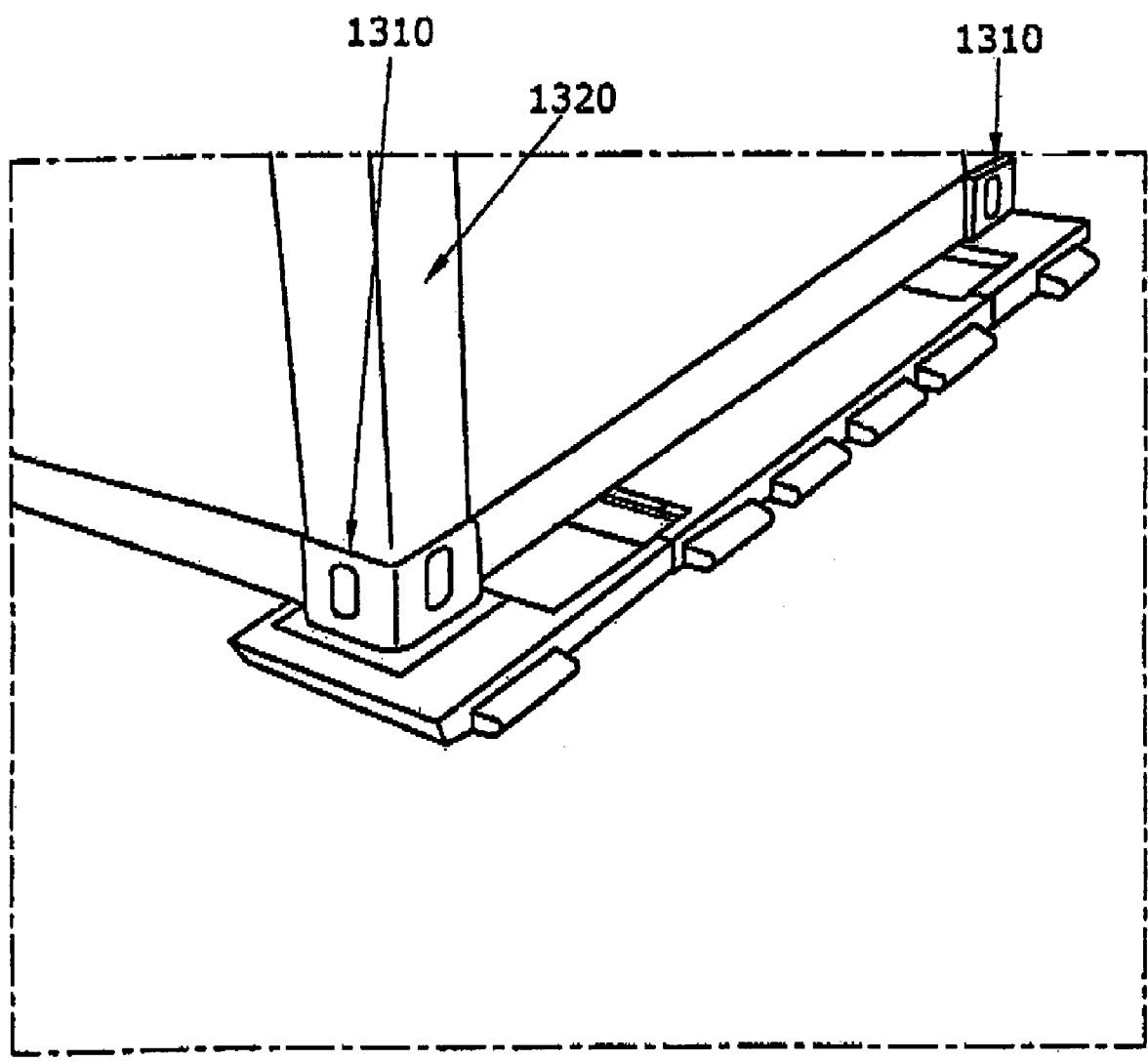

FIGS. 7-11 illustrate how one embodiment of the present invention can be secured to a cargo container. One or both extendable portions 130 may be extended or retracted, as necessary to adjust the distance between locking fittings 140 to mate up with corresponding castings 1310 on a cargo container, as shown in FIG. 7, thereby permitting a single skid assembly to be used with cargo containers of a variety of different sizes. Castings 1310 are preferably ISO corner castings as shown in FIG. 7, but can be any locking fitting receptacle capable of receiving a locking fitting and thereby removably attaching skid assembly 10 to container 1320. Each extendable portion 130 preferably is equipped with positive capture expansion locks 1210 as shown in FIGS. 8 and 9, which are spring-biased into a locked position in which an extendable pin is inserted into a detent recess in the elongate member. To change the distance between locking fittings 140, lever 1220 is pushed against biasing spring 1230 to retract the locking pin from the detent recess and to permit the extendable portion to be extended or retracted as necessary to align locking fittings 140 to simultaneously engage corresponding castings 1310 on the bottom surface of container 1320, as shown in FIG. 10.

Figure 11:
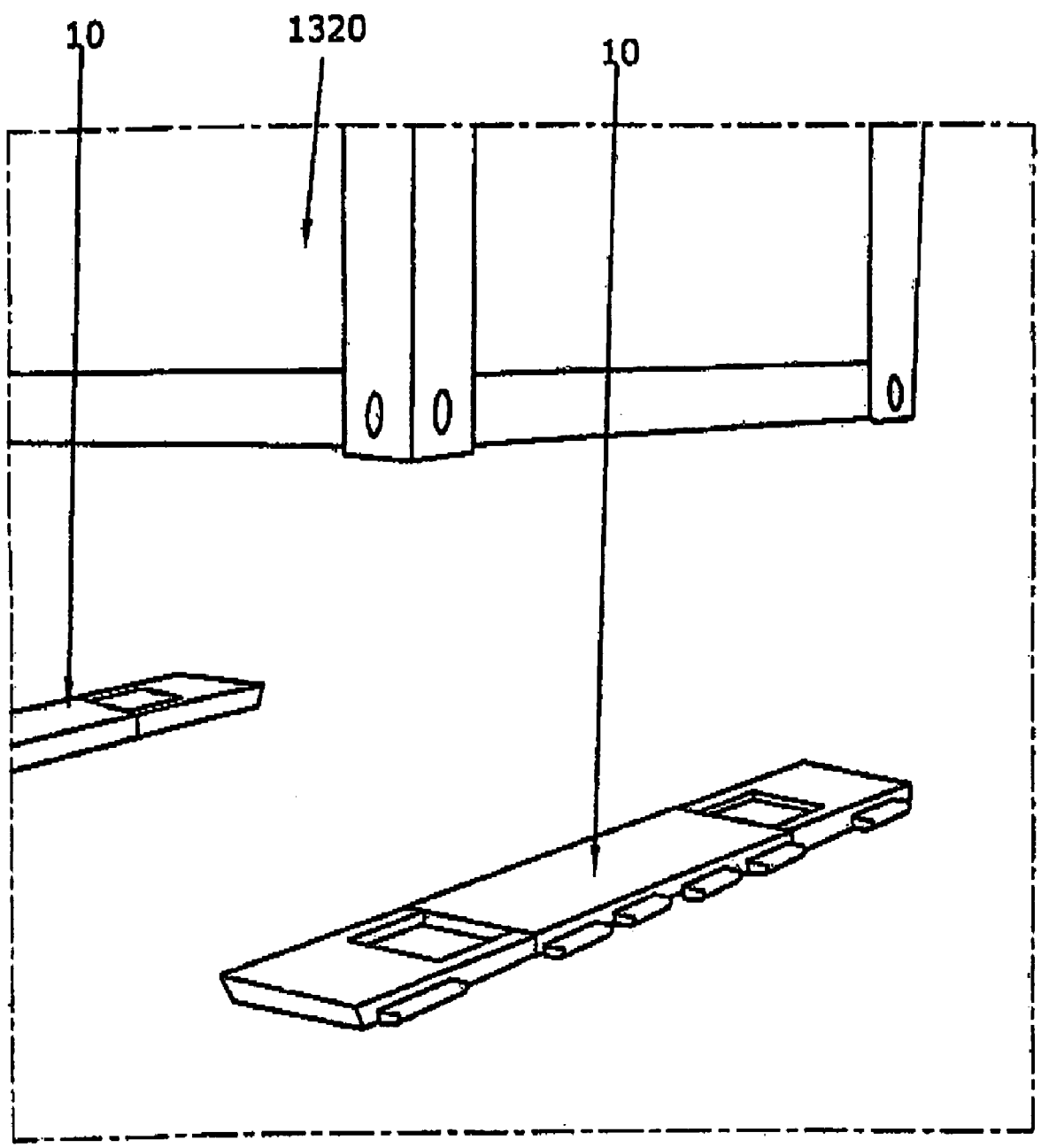

A pair of properly adjusted skid assemblies 10 can be placed on a flat surface, as shown in FIG. 11, with their respective side surfaces 210 (with at least one side extension 220 extending there from) facing away from each other and with the skid assemblies spaced an appropriate distance from each other such that, when container 1320 is lowered onto skid assemblies 10, each locking fitting 140 of each skid assembly 10 will be removably attached to a corresponding casting 1310 such that at least one side extension of the first skid assembly will extend outward past a first edge of the bottom surface of the cargo container and at least one side extension of the second skid assembly will extend outward past a second edge of the bottom surface, with the second edge being opposite the first edge of the cargo container. Alternately, the two skid assemblies can be removably attached to the container one at a time, either by lowering the container on each skid assembly in turn or by otherwise bringing the locking fittings of each skid assembly forcibly in contact with their respective corner contacts such that the locking fittings removably attach the skid assembly to the container. In order to remove skid assembly 10 from container 1320, a release, such as release lever 310, may be used to manually transfer clamping head 410 from the locked position to the clamping position to permit locking fitting 140 to be removed from casting 1310. Optionally, the skid assembly 10 can be fixedly attached to the bottom surface of the storage container, by welding, bolting, or other suitable technology to create an effectively rigid connection.

Once the pair of skid assemblies 10 has been attached to container 1320, the at least one side extension of the first skid assembly will be a fixed distance from the at least one side extension of the second skid assembly. This distance will preferably correspond to the spacing of elongate tracks in a cargo locking system of an aircraft cargo bay to permit an adapted cargo container to slideably engage at least two of the elongate tracks.

Figure 12:
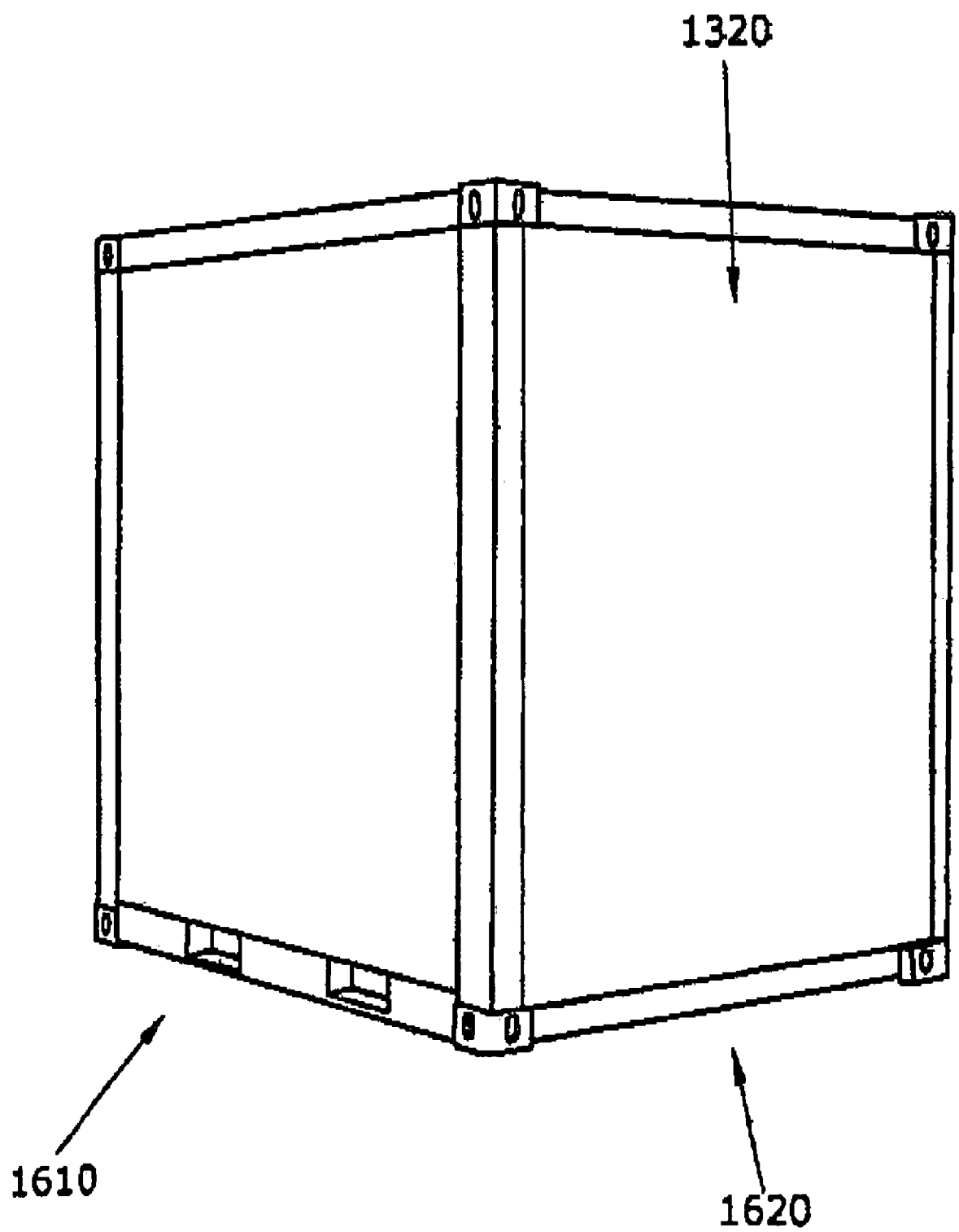

FIG. 12 illustrates a tricon container. In a preferred embodiment, the skid assembly is designed so that the skid assembly can be placed along any of the four bottom edges of the depicted container. For example, if a skid assembly is attached to side 1610 of the bottom surface of tricon container 1320 and a second skid assembly is attached to the opposite side, the spacing between the side extensions of the respective skid assemblies may be, for example, 88 inches, thereby permitting the adapted tricon container to slideably engage the 88-inch tracks of the C-17 Transall cargo system. Similarly, if a skid assembly is attached to side 1620 of the bottom surface of tricon container 1320 and a second skid assembly is attached to the opposite side, the spacing between the side extensions of the respective skid assemblies may be, for example, 108 inches, thereby permitting the adapted tricon container to slideably engage the 108-inch tracks of the C-130, C-141, C-5, B747, A400M, or the C-17 Log rail cargo system.

Figure 13:
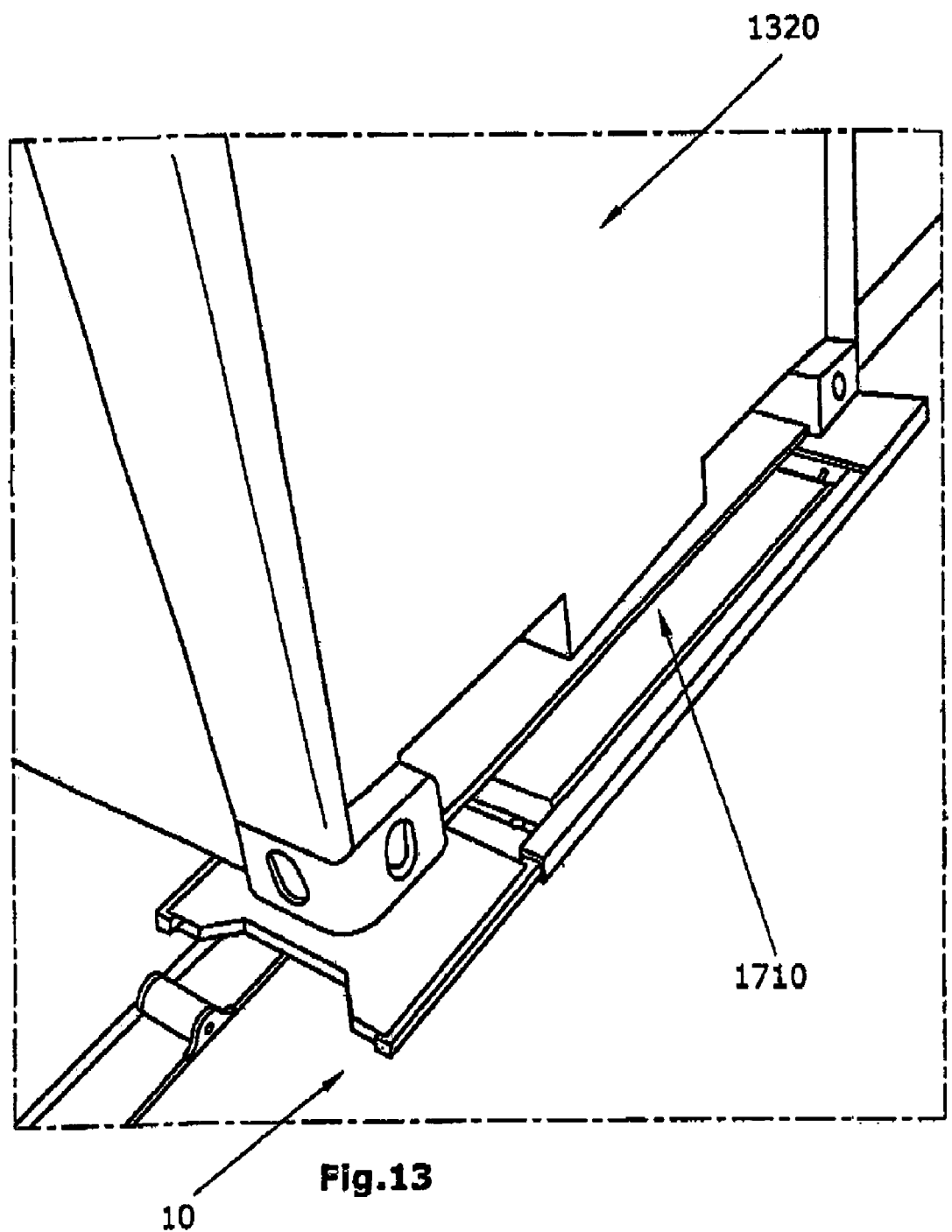

FIG. 13 illustrates two quadcon containers joined together. In a preferred embodiment, the skid assembly is designed so that the skid assembly can be placed along any of the four bottom edges of the depicted container. For example, attaching a skid assembly to side 1710 of the bottom surface of quadcon container 1320 and attaching a second skid assembly to the opposite side also will result in a side extension spacing of 108 inches, permitting the adapted quadcon container to slideably engage any of the 108-inch cargo systems listed above.

In an alternative embodiment, the skid assembly can optionally be constructed such that the elongate member has an upper surface, a lower surface, a first end surface that extends between an end of said upper surface and a proximate end of said lower surface and a second end surface opposite said first end surface that extends between said upper surface and said lower surface. The alternative skid assembly includes at least one end extension extending from the first end surface for slideably engaging a first elongate track of a cargo locking system and at least one end extension extending from the second end surface for slideably engaging a second elongate track of a cargo locking system. The elongate member can be equipped with one or more extendable portions that may be extended or retracted as necessary to adjust the distance between the end extensions of the first end surface and the end extensions of the second end surface to match the spacing of the elongate tracks (i.e., 88 inches or 108 inches) of various cargo locking systems to permit the adjusted skid assembly to slideably engage at least two of the elongate tracks. Preferably, the alternative skid assembly contains at least two locking fittings that are capable of interlocking with at least two correspondingly-positioned castings of a cargo container. Using this alternative skid assembly, it may be possible to secure a container using a single skid assembly because the end extension at the opposite ends of the assembly would engage to two separate tracks of the cargo locking system.

Preferably a pair of the alternative skid assemblies will be attached to a cargo container to form an adapted container that can slideably engage the elongate tracks of a cargo locking system. To accommodate containers of a variety of sizes, including non-standard sized containers, one or more of the locking fittings of the alternative skid assembly may be attached to a movable portion of the elongate member to permit the motion of one locking fitting relative to another to adjust the spacing between locking fittings 140 to align with the castings 1310 preinstalled on a particular container. This movable assembly may be accomplished by slideably attaching a portion of the upper surface to a pair of rails connected to the elongate member to permit the locking fitting attached thereto to be moved relative to another locking fitting. Additionally, the movable portion may be locked into a desired position by engaging a locking device, preferably using positive capture expansion locks as discussed above for the extendable portion. Because the position of the one or more locking fittings relative to the end extensions and their spacing relative to each other can be varied independently of the spacing of the end extensions, it is possible to accommodate a larger variety of container sizes, including containers with dimensions substantially smaller than the standard spacing between the elongate tracks of the cargo locking system of a conventional cargo aircraft. This independent adjustment also allows the lateral location of the container to be adjusted relative to the elongate tracks to advantageously adjust the weight distribution of the total load in a cargo aircraft, which one of skill in the art will recognize is important to the stability and performance of a cargo aircraft in flight.

Figure 14:
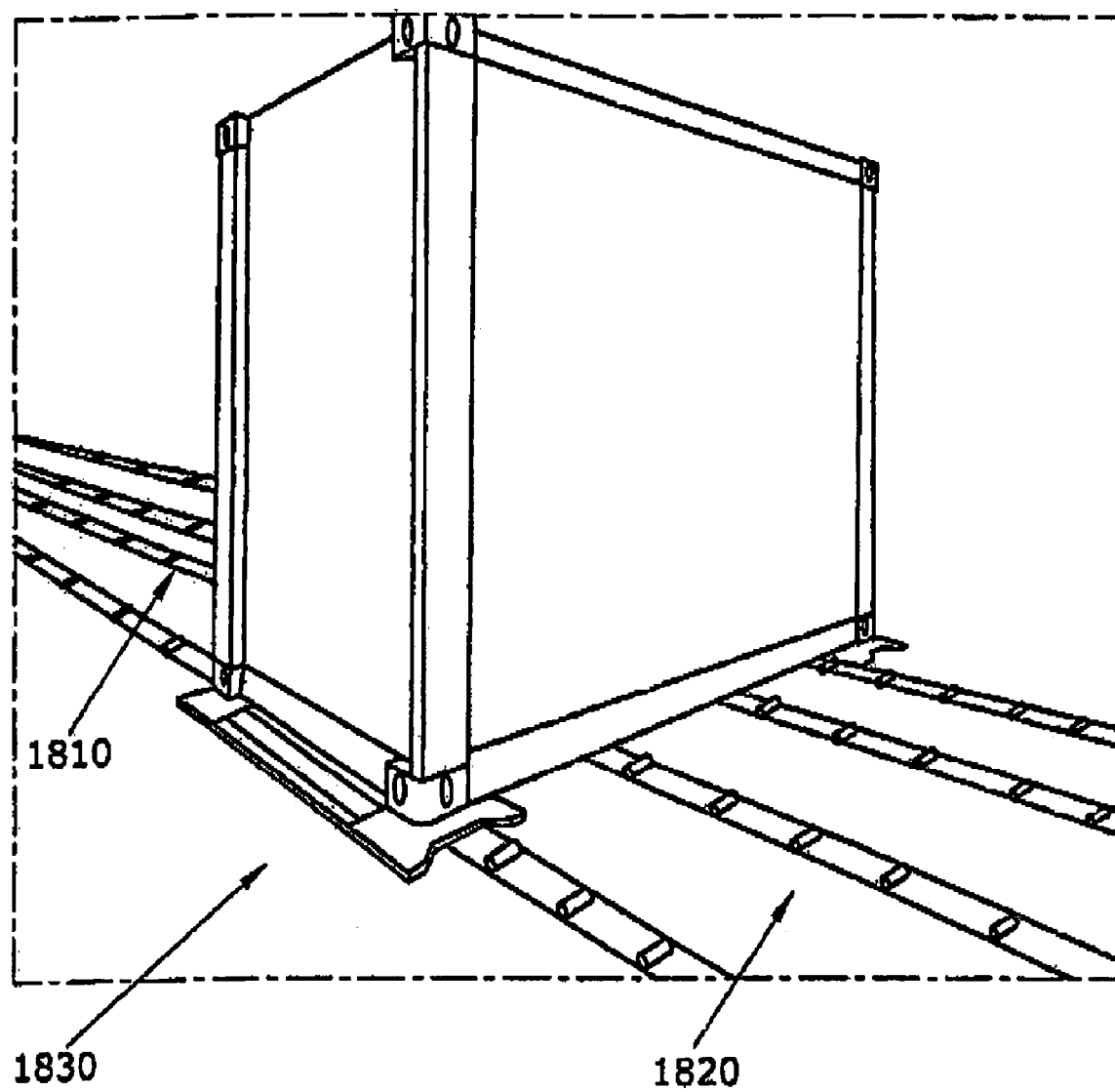

A conventional cargo aircraft, such as the C-17 depicted in FIG. 14 is equipped with cargo bay 1810 which comprises cargo conveyor system 1820 to permit cargo containers to slide along the aircraft cargo bay floor and cargo locking system 1830 to lock the cargo containers in place. Cargo locking system 1830 preferably comprises a plurality of elongate tracks attached to a top surface of the aircraft cargo bay floor, and a retractable locking device which is movable between two positions, 1) a retracted position wherein the retractable locking device is substantially retracted so as to permit the skid assembly to move along at least one of the plurality of elongate tracks, and 2) an engaged position wherein at least one locking pin of the retractable locking device is extended above the top surface of the aircraft cargo bay floor to prevent the skid assembly from moving along at least one of the plurality of elongate tracks. Preferably each of the elongate tracks includes a channel for guiding at least one side extension along at least one of the plurality of elongate tracks.

Cargo conveyor system 1820 preferably comprises a plurality of rollers so as to permit the skid assembly to move across the rollers and to slideably engage at least one of the elongate tracks of the cargo locking system. One of ordinary skill in the art will appreciate that a variety of alternatives to the plurality of rollers may be employed without falling outside the scope of the present invention, for example, a conveyor belt of the type well know in the art.

Figure 15:
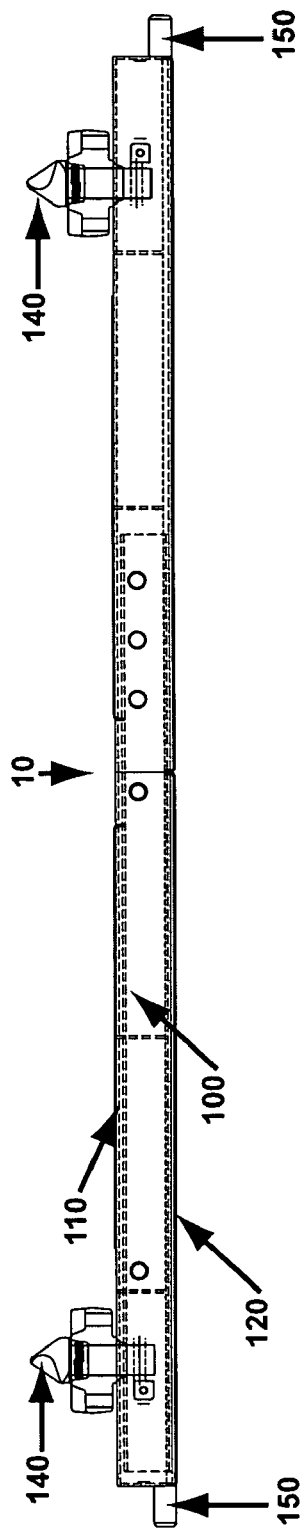
FIG. 15 represents a side view of a preferred embodiment of the present invention including a plurality of end extensions.

As shown in FIG. 15, skid assembly 10 comprising elongate member 100 having upper surface 110, lower surface 120, extendable portions 130, locking fittings 140, and end extensions 150.

Figure 16:
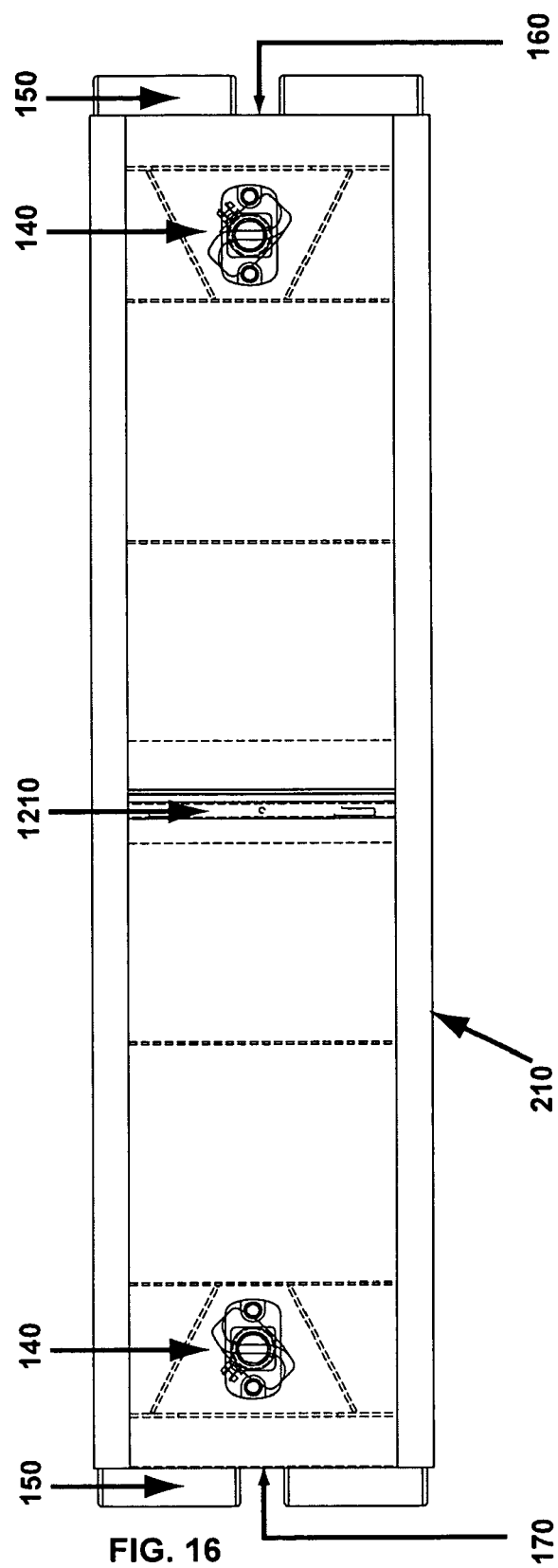
FIG. 16 represents a top view of the preferred embodiment of FIG. 15.

FIG. 16 provides a top view of skid assembly 10 in a retracted position, which further comprises first end surface 160 with at least one end extension 150 extending therefrom and second end surface 170 with at least one end extension 150 extending therefrom. As discussed above, in a preferred embodiment, one or both extendable portions 130 may be extended or retracted, as necessary to adjust the distance between locking fittings 140 to mate up with corresponding castings 1310 on a cargo container.

Figure 17:
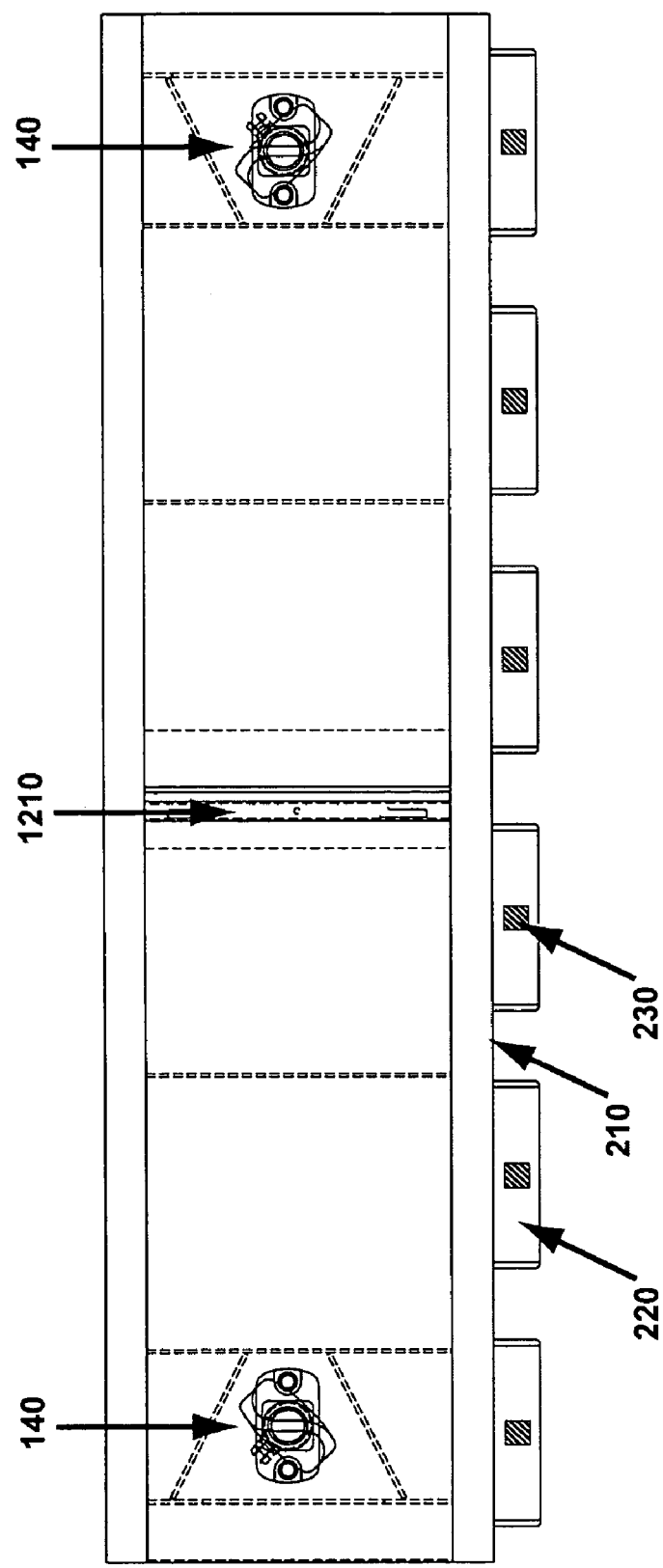
FIG. 17 represents a top view of the preferred embodiment of FIG. 1

FIG. 17 provides a top view of skid assembly 10, further comprising at least one side extension 220 extending from side surface 210. At least one of said side extensions includes an opening 230 for receiving a locking pin.

As may be appreciated from the discussion above, a technical advantage of the present invention is that it provides significant weight savings over the prior art pallet, dunnage, and chains systems.

Another technical advantage of the present invention is that it provides significant space savings over the prior art pallet, dunnage, and chains systems by permitting storage containers to be loaded more closely to each other, thereby allowing more containers to fit within the cargo bay of a particular aircraft.

Another technical advantage of the present invention is the ability to expand the adapter for use with a variety of container sizes.

Another technical advantage of the present invention is the ability to collapse for storage.

Other embodiments and uses of the invention will be apparent to those skilled in the art from consideration of the specification and practice of the invention disclosed herein. The specification and examples should be considered exemplary only with the true scope and spirit of the invention indicated by the following claims. U.S. Pat. No. 5,765,977 is hereby incorporated by reference in its entirety. As will be easily understood by those of ordinary skill in the art, variations and modifications of each of the disclosed embodiments can be easily made within the scope of this invention as defined by the following claims.

What is claimed is:

1. A skid assembly for use with a cargo container, the skid assembly comprising:
    an elongate member having an upper surface, a lower surface, and a side surface that extends between said upper surface and said lower surface;
    a plurality of side extensions spaced at predetermined intervals along the side surface;
    a first locking fitting, attached to the upper surface, for removably attaching the skid assembly to a first casting located on the lower surface of the cargo container;
    a second locking fitting, attached to the upper surface, for removably attaching the skid assembly to a second casting located on the lower surface of the cargo container, and positioned relative to the first locking fitting to permit the first and second locking fitting to be simultaneously removably attached to the first and second castings, respectively; and
    at least one rigid movable portion for varying the spacing between the first locking fitting and the second locking fitting to enable the assembly to be adapted to attach to cargo containers of a plurality of sizes.

2. The assembly of claim 1, wherein:
    the at least one rigid movable portion can be retracted to reduce the overall dimensions of the assembly for storage.

3. The assembly of claim 1, wherein:
    at least one of the first and second castings comprises an ISO corner casting.

4. A skid assembly for use with a cargo container, the skid assembly comprising:
    an elongate member having an upper surface, a lower surface, and a side surface that extends between said upper surface and said lower surface;
    at least one side extension extending from the side surface;
    a first locking fitting, attached to the upper surface, for removably attaching the skid assembly to a first casting located on the lower surface of the cargo container; and
    a second locking fitting, attached to the upper surface, for removably attaching the skid assembly to a second casting located on the lower surface of the cargo container, and positioned relative to the first locking fitting to permit the first and second locking fitting to be simultaneously removably attached to the first and second castings, respectively,
    wherein the elongate member includes at least one rigid section of variable dimension such that the relative positions of the first locking fitting and the second locking fitting may be adjusted in at least one dimension.

5. The assembly of claim 4, wherein the at least one side extension further comprises:
    at least one opening for receiving a locking pin.

6. A skid assembly for use with a cargo container, the skid assembly comprising:

an elongate member having an upper surface, a lower surface, and a side surface that extends between said upper surface and said lower surface;
a plurality of side extensions spaced at predetermined intervals along the side surface;
a first locking fitting, attached to an end of the upper surface; and
a second locking fitting, attached to an opposite end of the upper surface and positioned relative to the first looking fitting to permit the first and second looking fittings to be simultaneously removably attached to corresponding first and second castings of the cargo container, respectively; and
at least one rigid extendable portion for varying the spacing between the first locking fitting and the second locking fitting to enable the assembly to be adapted to attach to cargo containers of a plurality of sizes.

7. The assembly of claim 6, wherein:
the extendable portion can be retracted to reduce the overall dimensions of the assembly for storage.

8. A skid assembly for use with a cargo container, the skid assembly comprising:
an elongate member having an upper surface, a lower surface, and a side surface that extends between said upper surface and said lower surface;
a plurality of side extensions spaced at predetermined intervals along the side surface;
a first locking fitting, attached to the upper surface; and
a second locking fitting, attached to the upper surface and positionable relative to the first locking fitting by at least one rigid extendable portion of the elongate member.

9. An adapter system for a cargo container, the system comprising:
a first elongate member having an upper surface and a side surface, said first elongate member comprising:
at least one extension extending outwardly from the side surface of the first elongate member and adapted to engage a cargo locking system;
a first locking fitting attached to the upper surface of said first elongate member and adapted to engage the cargo container;
a second locking fitting attached to the upper surface of said first elongate member and adapted to engage the cargo container; and
at least one adjustable segment that permits a spacing between the first locking fitting and the second locking fitting to be adjusted in at least one direction; and
a second elongate member having an upper surface and a side surface, said second elongate member comprising:
at least one extension extending outwardly from the side surface of the second elongate member and adapted to engage a cargo locking system;
a third locking fitting attached to the upper surface of said second elongate member and adapted to engage the cargo container,
a fourth locking filling attached to the upper surface of said second elongate member and adapted to engage the cargo container; and
at least one adjustable segment that permits a spacing between the third locking fitting and the fourth locking fitting to be adjusted in at least one direction;
wherein a spacing between the first elongate member and the second elongate member may be adjusted in at least one direction.

10. The system of claim 9, wherein the at least one adjustable segment of the first elongate member and the at least one adjustable segment of the second elongate member comprise rigid adjustable segments.

11. The system of claim 9, wherein the first elongate member may be positioned relative to the cargo container independently of the second elongate member.

* * * * *